(12) United States Patent
Wiener et al.

(10) Patent No.: US 10,942,293 B2
(45) Date of Patent: Mar. 9, 2021

(54) ROCK PHYSICS BASED METHOD OF INTEGRATED SUBSURFACE RESERVOIR CHARACTERIZATION FOR USE IN OPTIMIZED STIMULATION DESIGN OF HORIZONTAL WELLS

(71) Applicant: Halliburton Energy Services, Inc., Houston, TX (US)

(72) Inventors: Jacky Muri Wiener, Aurora, CO (US); Muthukumarappan Ramurthy, Greenwood Village, CO (US); Donald Pat Kundert, Broomfield, CO (US); John Bosco Le Tran, Westminster, CO (US); Meagan Renee Stephens, Littleton, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 306 days.

(21) Appl. No.: 15/983,570

(22) Filed: May 18, 2018

(65) Prior Publication Data
US 2019/0025461 A1 Jan. 24, 2019

Related U.S. Application Data

(60) Provisional application No. 62/535,637, filed on Jul. 21, 2017.

(51) Int. Cl.
*G01V 99/00* (2009.01)
*E21B 43/30* (2006.01)
(Continued)

(52) U.S. Cl.
CPC ............ *G01V 99/005* (2013.01); *E21B 43/26* (2013.01); *E21B 43/305* (2013.01); *E21B 47/14* (2013.01); *E21B 49/006* (2013.01); *G01V 1/147* (2013.01); *G01V 1/181* (2013.01); *G01V 1/22* (2013.01); *G01V 1/306* (2013.01); *G01V 1/40* (2013.01);
(Continued)

(58) Field of Classification Search
CPC ........ E21B 43/26; E21B 43/305; E21B 47/14; E21B 49/006; G01V 1/147; G01V 1/181; G01V 1/22; G01V 1/306; G01V 1/40; G01V 1/42; G01V 99/005
See application file for complete search history.

(56) References Cited

U.S. PATENT DOCUMENTS

| | | | | |
|---|---|---|---|---|
| 10,445,669 B2 * | 10/2019 | Wessling | ............... | G01V 11/00 |
| 2011/0295510 A1 * | 12/2011 | Gulati | ..................... | G01V 1/288 |
| | | | | 702/16 |
| 2012/0179444 A1 * | 7/2012 | Ganguly | ................. | E21B 43/26 |
| | | | | 703/10 |

OTHER PUBLICATIONS

Bosch, M., Mukerji, T., and Gonzalez, E.F. 2010. Seismic Inversion for Reservoir Properties Combining Statistical Rock Physics and Geostatistics: A Review. Geophysics 75 (5): 75A165-75A176, (12 pages).

* cited by examiner

*Primary Examiner* — Bryan Bui
(74) *Attorney, Agent, or Firm* — Thomas Rooney; Baker Botts L.L.P.

(57) ABSTRACT

A procedure that integrates petrophysics and rock typing taken from vertical well measurements, 3D seismic elastic properties and seismic attributes, and geostatistical modeling to build a 3D reservoir model is provided. The 3D reservoir model may be directly incorporated into horizontal fracture model designs. The developed 3D reservoir model for a subsurface volume may be used in a fracture model to optimize fracturing designs and maximize well performance.

20 Claims, 10 Drawing Sheets

(51) Int. Cl.
  *E21B 47/14* (2006.01)
  *E21B 49/00* (2006.01)
  *G01V 1/30* (2006.01)
  *G01V 1/40* (2006.01)
  *G01V 1/147* (2006.01)
  *G01V 1/18* (2006.01)
  *G01V 1/22* (2006.01)
  *E21B 43/26* (2006.01)
  *G01V 1/42* (2006.01)
  *G06F 111/10* (2020.01)

(52) U.S. Cl.
  CPC ............ *G01V 1/42* (2013.01); *G01V 2200/16* (2013.01); *G01V 2210/1295* (2013.01); *G01V 2210/6169* (2013.01); *G01V 2210/6242* (2013.01); *G01V 2210/646* (2013.01); *G01V 2210/665* (2013.01); *G06F 2111/10* (2020.01)

ELASTIC PROPERTIES VS. ROCK PROPERTIES

IMPEDENCE VS. CLAY VOLUME

VELOCITY VS. RESISTIVITY

IMPEDANCE VS. POROSITY

ROCK PHYSICS BASED METHOD OF INTEGRATED SUBSURFACE RESERVOIR CHARACTERIZATION FOR USE IN OPTIMIZED STIMULATION DESIGN OF HORIZONTAL WELLS

CROSS REFERENCE TO RELATED APPLICATION

This patent application claims priority to U.S. Provisional Patent Application No. 62/535,637, entitled "3D ROCK PHYSICS BASED RESERVOIR MODEL FOR HORIZONTAL WELLS", filed on Jul. 21, 2017.

TECHNICAL FIELD

The present disclosure relates generally to fracture modeling of horizontal wells and, more particularly, to a rock physics based 3D reservoir model for use in stimulation of horizontal wells.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Subterranean operations involve a number of different steps such as, for example, shooting a 3D seismic survey, drilling a wellbore at a desired well site, treating and stimulating the wellbore to optimize production of hydrocarbons, and performing the necessary steps to produce and process the hydrocarbons from the subterranean formation.

Treating and stimulating a wellbore can include, among other things, delivering various fluids, mainly water (along with additives, proppants, gels, etc.) to the wellbore under pressure and injecting those fluids into the wellbore. One example treatment and stimulation operation is a hydraulic fracturing operation in which the fluids are highly pressurized via pumping systems to create fractures in the subterranean formation. Fracturing operations are often performed in many stages during completion of long horizontal stretches of wells drilled to access unconventional oil and gas reserves. Detailed subsurface characterization of a reservoir provides useful information for developing such unconventional oil and gas assets.

In unconventional, horizontal drilling environments, the process of treating/stimulating the wellbore typically involves dividing the horizontal wellbore into several evenly spaced stages for completion, without regard to subsurface geology. Information about the geology of the subsurface formations is merely utilized for determining where to drill the well and not for designing individual stages for a multi-stage completion of the horizontal well. Although some progress has been made with regard to integrating geological considerations into completions design in unconventional drilling environments, these techniques have had very little effect on the ultimate production of oil and gas from the well due to the nature of the integrating technique. As such, it is now recognized that more effective ways of utilizing advanced, integrated reservoir characterization techniques for engineering completions within long horizontal wells are needed.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
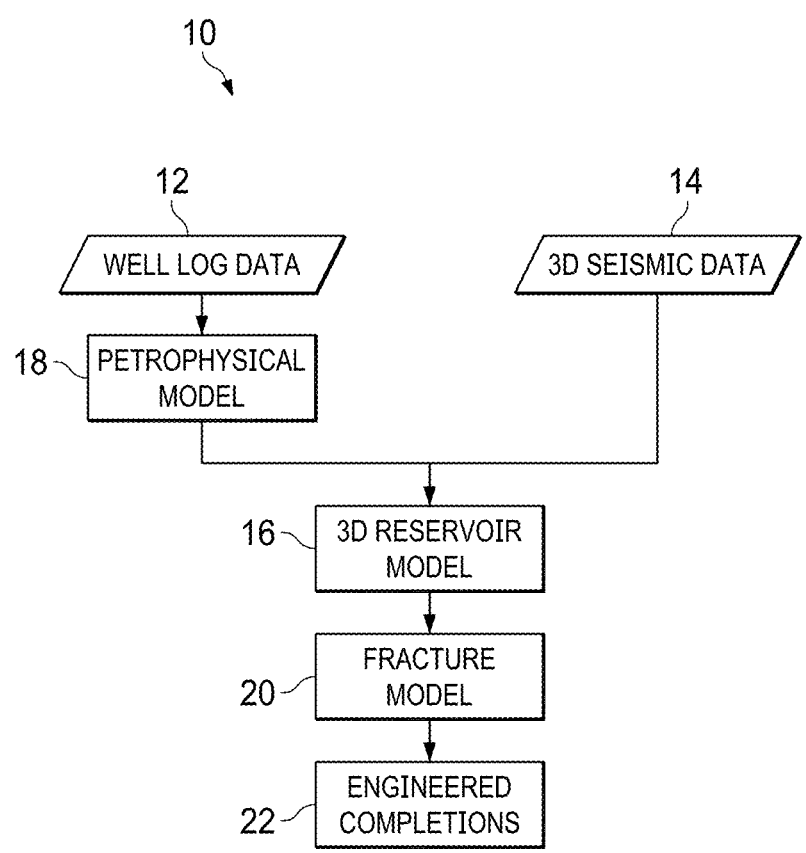
FIG. 1 is a schematic block diagram of a workflow for designing engineered completions based on existing, subsurface well log data and 3D seismic data, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection or monitoring wells as well as horizontal production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques for formation evaluation. Devices and methods in accordance with certain embodiments may be used in one or more of wireline (including wireline, slickline, and coiled tubing), downhole robot, MWD, and LWD operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The terms "couple" or "couples" as used herein are intended to mean either an indirect or a direct connection. Thus, if a first device couples to a second device, that connection may be through a direct connection, or through an indirect mechanical, electromagnetic, or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

The present disclosure is directed to a statistical rock physics workflow for subsurface reservoir characterization that integrates petrophysical and facies analysis from wireline well logs, 3D seismic analysis of 3D seismic data, spatial data analysis employing geostatistics, and fracture modeling (and all of their respective uncertainties) into a comprehensive subsurface reservoir model. The reservoir model may be used to identify horizontal drilling targets, determine the amount of hydrocarbons in place, understand horizontal well recovery factors, optimize stimulation designs, allow for production prediction, optimize horizontal well spacing, compare the stock-tank original oil in place (STOOIP) calculations (at a given recovery factor) with actual fracturing results, and help to manage realistic expectations for hydrocarbon production. This approach helps to integrate geology and geophysics for drilling engineers, reservoir engineers, reserve engineers, and completion engineers.

Detailed subsurface characterization for developing unconventional oil and gas assets is useful for understanding where and how to drill horizontal wells, pinpointing subsurface drilling targets, identifying reservoir sweet spots, determining stock-tank original oil in place (STOOIP) numbers, calculating recovery factors, optimizing well spacing in a drilling spacing unit (DSU), and engineered completion designs. Recently there has been an emphasis by oil and gas operators on providing "engineered completions" along relatively long deviated or horizontal wells when developing unconventional oil and gas assets. The term "engineered completions" refers to using information about the subsurface geology of a field in which an oil and gas well is drilled to design the horizontal well completions (e.g., number of stages, spacing of stages, stimulation design for each stage, i.e., amount of fluids, amount of proppant, pumping rates, etc.). Existing engineered completions generally involve collecting LWD data through a horizontal well to collect information about the well, and analyzing the data to separate lengths of the horizontal well into different rock "types" or zones. As such, the engineered completions are based on LWD data and near-field analysis of said data. The LWD data is extremely limited for determining critical reservoir properties (e.g., hydrocarbon saturation, effective porosity, stress, etc.). The information relied on for engineering the completions of the wellbore is limited to an area just around the borehole, without taking into account the geology of the field at further distances from the borehole. The geology at these further distances can have a significant impact on just how much oil and gas can be produced from the well once completions are performed along the length of the wellbore. This is because the fracture stimulation grows above and below the horizontal well and these rocks also contribute to hydrocarbon production. In addition, it can be difficult to perform the necessary logging along the well since the wireline can be difficult to lower through long horizontal runs.

Taking additional measurements from a vertical offset well can provide greater information about the geology of the field at further distances from the horizontal well. However, there is still a need for enhanced determination of geology around unconventional horizontal wells to determine more accurate production predictions and provide more productive completions.

The present disclosure provides a system and method that uses statistical rock physics techniques to address these complex unconventional reservoir challenges along the horizontal well and away from it. The disclosed procedure integrates detailed petrophysical analysis and rock typing taken from vertical well measurements, 3D seismic elastic inversion properties, and geostatistical analysis to build a comprehensive 3D reservoir model, and then directly incorporates the reservoir model into a fracture stimulation model to design the engineered completions. This disclosure discusses the utilization of the developed 3D reservoir model in a fracture model to optimize fracturing designs and, in some cases, the use of both the 3D reservoir model and the fracture model in a dynamic reservoir model to optimize horizontal well spacings, define drainage areas, and history match production.

The workflow described herein is particularly useful in locations where horizontal pad drilling is performed. In such regions, operators often experiment with well spacing in a DSU, stage spacing, fluids, and proppant volumes during drilling and completion operations. It is desirable to increase recovery factors in a DSU while maintaining individual well economics (i.e., return on capital employed (ROCE)). The disclosed workflow directly addresses these concerns, enabling operators to make more informed decisions going forward with regard to identifying horizontal targets, determining the optimum number of wells per DSU, and optimizing staging and completion designs.

In some embodiments, the developed 3D reservoir model may be fed into the fracture model to optimize fracturing and production designs. The 3D reservoir model and fracture model may then be input into a dynamic reservoir model to complete various optimizations within the dynamic model. The dynamic model may be used to optimize well-spacing of multiple wells within a well pad, determine drainage areas, and history match production.

In some embodiments, the methods and systems of the present disclosure may facilitate determining how much hydrocarbon is in place in a subterranean reservoir to understand the recovery factor and drainage area of a given well. Using the 3D statistical rock physics reservoir model and optimizing the fracture designs to recover the most hydrocarbon from that zone is one of the main objective of optimized designs. Thus, another objective of the methods and systems of the present disclosure may include optimizing the number of wells to be placed in a drilling section or block based on the understanding of the amount of hydrocarbon in place, how the wells interfere with each other, and how much oil and gas can be recovered.

Steps of the workflow described herein may be performed by one or more information handling systems containing at least a processor and a memory. The memory may contain instructions that, when executed by the processor, cause the processor to perform certain functions to generate the disclosed reservoir model.

Turning now to the drawings, FIG. 1 is a schematic block diagram generally illustrating a workflow 10 in accordance with an embodiment of the disclosure. The workflow 10 may involve the use of well log data 12 and 3D seismic data 14 to generate an improved 3D reservoir model 16 of the field in which a horizontal well is drilled. More specifically, the well log data 12 may be analyzed to determine a petrophysical model 18 of subsurface rock properties along the length of each of the wells from which the log data 12 was taken. The rock properties from this petrophysical model 18 may be correlated with 3D seismic elastic inversion and/or attribute data 14 taken across the entire well field in order to generate the 3D reservoir model 16.

The applied statistical rock physics approach for reservoir characterization (3D reservoir model 16) integrates fundamental petrophysical concepts (petrophysical model 18) of effective porosity, hydrocarbon saturation, clay volume, rock density, and geomechanics with statistical and non-statistical pattern recognition (machine learnings), 3D seismic elastic inversion and seismic attribute analysis (3D seismic data 14), and geostatistical spatial modeling. The petrophysical concepts and models enable the linkage between rock properties determined by wireline well logs (petrophysical model 18) and seismic inverted elastic properties and multi-dimensional seismic attributes (3D seismic data 14) to extend the data for training purposes in a supervised neural network or an unsupervised classification scheme via machine leanings. Multiple, equiprobable geostatistical simulations enhance the spatial correlation of the learned rock properties and help define small-scale variability and uncertainty analysis, in the resulting 3D reservoir model 16. Additionally, geostatistics play a key role in helping to reduce uncertainty by running multiple equiprobable realizations of the reservoir properties and extracting probability distributions for each rock property in the model.

Data from the 3D reservoir model 16 (e.g., hydrocarbon saturation, effective porosity, clay volume, bulk density, Young's modulus, and Poisson's ratio) may then be input directly into a 3D fracture model 20, which then performs fracture simulations on multiple wells to determine the optimum completion design 22 for the horizontal wells. The engineered completions 22 may include information regarding the spacing of well stages to be completed as well as specific fracture designs for each stage. Providing engineered completion designs 22 based on the 3D reservoir model 16 disclosed herein help high-grade and rank horizontal drilling well pads, define the amount of hydrocarbon in place, manage production expectations, and identify critical factors for increasing barrels per completed foot of the lateral in any given area of a particular basin.

Figure 2A:
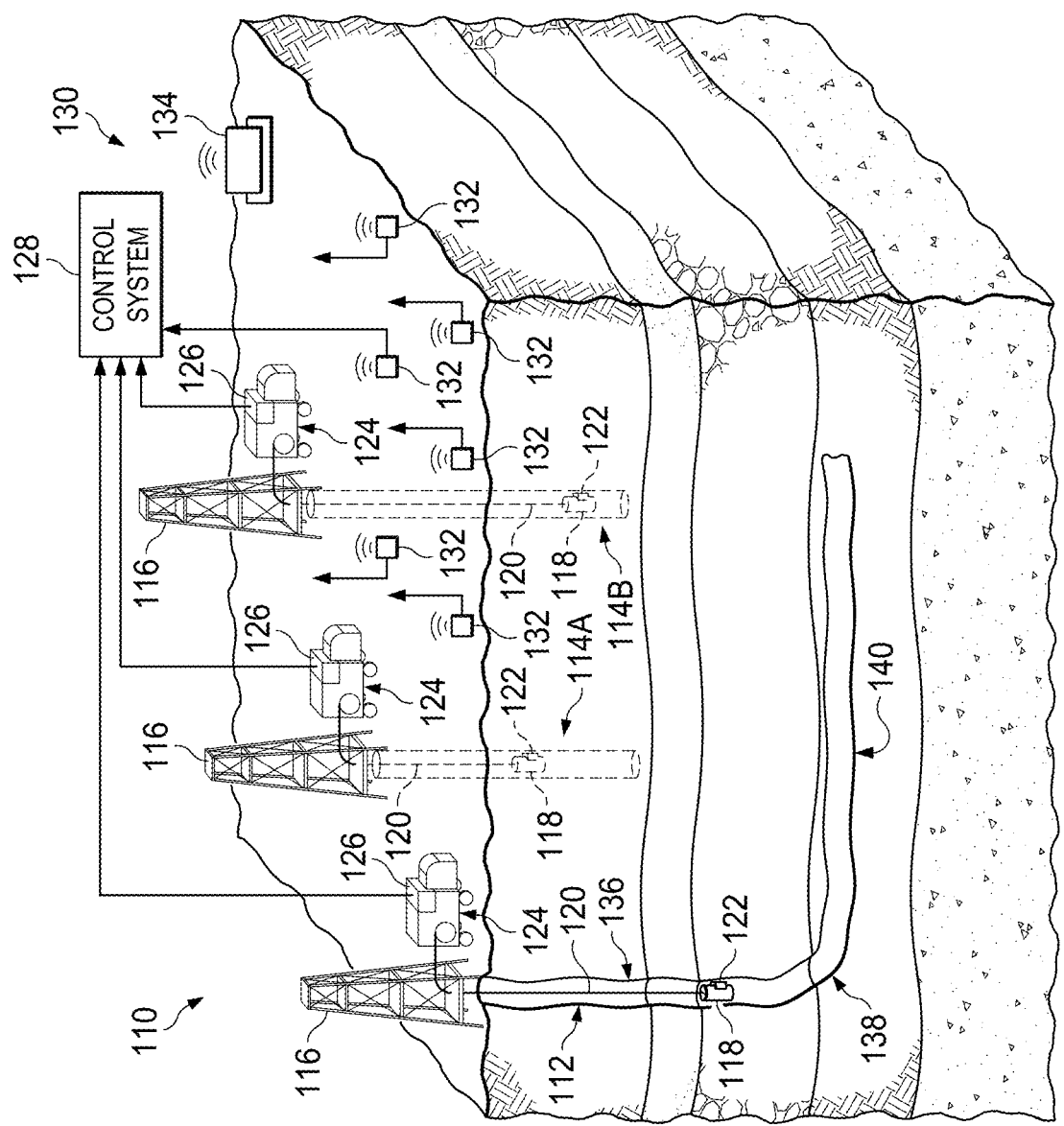
FIG. 2A is a schematic partial cutaway view of a well site equipped with sensor equipment and having a horizontal well in which engineered completions may be performed based on readings from the sensor equipment, in accordance with an embodiment of the present disclosure.

FIG. 2A illustrates a well system 110 that includes various physical components used to collect the input data for the optimization workflow of FIG. 1. It should be noted that FIG. 2A illustrates a simplified well system 110, and that multiple additional or different components than those illustrated in the figure may be utilized to collect the desired well log data and 3D seismic data. The well system 110 may be implemented across a relatively large well pad in which one or more horizontal wells 112 may be drilled to recover hydrocarbons from a subterranean reservoir.

As illustrated, one or more vertical wells (e.g., 114A and 114B) may be drilled at various locations in and around the horizontal well pad. For each of these vertical wells 114, and the horizontal well 112, a derrick 116 may be located at a surface of the well 114 and used to lower various equipment downhole during formation, logging, and/or completion of the wellbores 112 and 114. After the wells 112/114 have been drilled to depth, the drill pipe may be removed, the wellbore 112/114 may be cased (if desired), and/or a logging tool 118 may be lowered downhole via, for example, a wireline 120. The logging tool 118 may be equipped with one or more sensors 122 that are used to detect various properties of the wellbore and surrounding areas. These sensors 122 may include, but are not limited to, gamma ray sensors, resistivity sensors, acoustic sensors, nuclear sensors (neutron porosity, bulk density), etc. The sensors 122 may be generally used to detect properties of the formations through which the wellbores 112/114 are drilled. The measurements taken by these sensors 122 may be generally limited to formation locations close to the wellbore 114 (i.e., "near field").

The wireline 120 used to lower the logging tool 118 downhole may be unspooled to a downhole location via a wireline truck 124, and the wireline truck 124 may further include an on-board communication system 126 (or control system) designed to transmit log data received via the logging tool 118 to a separate control system 128 used to perform the workflow steps of FIG. 1. This log data may be transmitted from the wireline trucks 124 to the control system 128 via a wired or wireless connection, as will be understood by one of ordinary skill in the art.

Although illustrated as a logging tool 118 lowered downhole on a wireline 120, in other embodiments, a similar logging tool 118 may be lowered downhole on a different type of apparatus and used to collect the desired log data. For example, the logging tool 118 may be lowered downhole on a slickline, on coiled tubing, or incorporated into the bottom hole assembly of a drill string during the initial phase of drilling the well. Other systems and methods for lowering a logging tool 118 down a wellbore will be understood by those having ordinary skill in the art.

Although two vertical wells 114 are illustrated in FIG. 2A, it should be noted that the disclosed well system 110 is not to be limited to this number of vertical wells 114 formed at various positions on a well pad. In other embodiments, the system 110 may include 3, 4, 5, 6, 7, 8, 9, 10, or more vertical wells 114 formed at different positions on a well pad to provide near-field vertical well log data at a number of different locations within the targeted reservoir. The more vertical well logs that are taken, the more detailed rock property information may be obtained through petrophysical analysis for combining with 3D seismic data to generate the enhanced 3D subsurface reservoir model. Additional horizontal well logs may be taken in the area as well.

The well system 110 may include a 3D seismic data collection system 130 used to collect seismic data within the 3D volume of the well pad where the horizontal wells 112 are to be drilled. The 3D seismic data collection system 130 may include an array of receivers (e.g., geophones) 132 located at spaced intervals about the well pad, and seismic source transmitters 134. The geophones 132 may be equidistantly spaced from each other and arranged in a grid in some embodiments. The area in which the geophones are located may range from a few square miles to as large as hundreds of square miles. The source transmitters 134 may include any type of seismic source used to send sound waves down into the reservoir. In some embodiments, the transmitter 134 may include a "thumper" that drops a large weight on the ground to send sound waves down into the reservoir at an angle. The sound waves recorded by the receivers (i.e., geophones) will generally change while propagating through the reservoir due to the change in subterranean formations. The sound waves are reflected back at particular angles and picked up by the array of geophones 132. The 3D seismic data received at the geophones 132 may be transmitted via a communication system from the geophones 132 to the control system 128. The source transmitter 134 may be moved to different locations along the survey to transmit sound waves into the reservoir from various different angles. The geophones 132 may detect changes in the reflected sound waves at different positions of the source 134 to determine 3D seismic data for the reservoir. The seismic data may provide a measurement of the quality of layers in the subsurface 3D volume.

Besides the components described above, which are used to collect the data that goes into generating the disclosed 3D reservoir model, the well system 110 of FIG. 2A may also include at least one horizontal or deviated wellbore 112 in which engineered completions are to be performed based on an analysis provided by the control system 128. As illustrated, the well 112 may include a vertical portion 136 extending downward through the reservoir before curving at a heel portion 138 of the well 112. The rest of the well 112 may be a horizontal portion 140 that extends a relatively lengthy distance in a horizontal direction (or a direction that is within less than 10 degrees of horizontal). The horizontal portion 140 of the well 112, as shown, may be several times longer than the vertical portion 136 of the well 112.

Figure 2B:
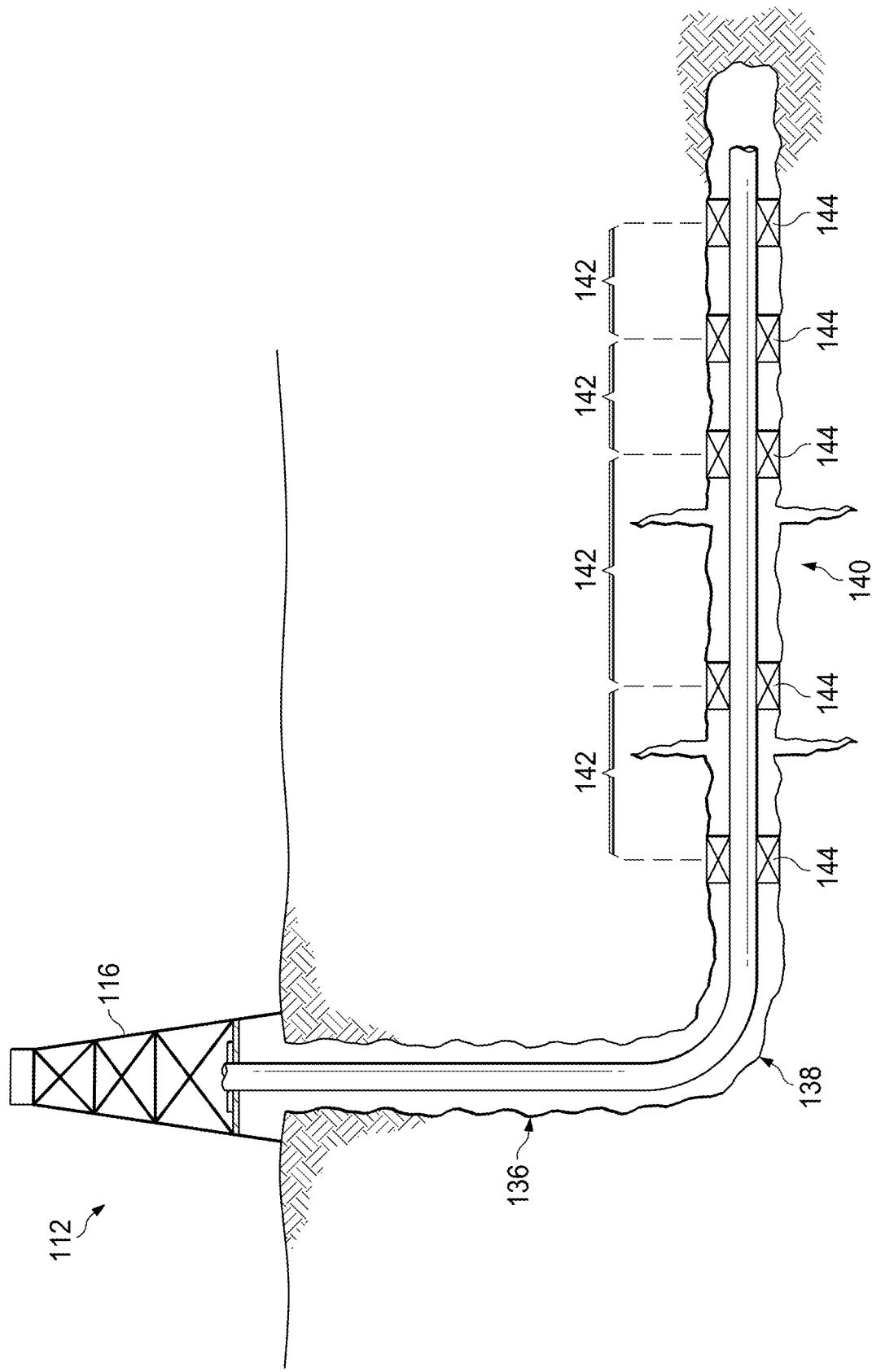
FIG. 2B is a schematic cross-sectional view of a horizontal well from the well site of FIG. 2A with optimized engineered completions in accordance with an embodiment of the present disclosure.

As shown in FIG. 2B, the horizontal portion 140 of the well 112 may be broken up into several different stages 142 during completion operations performed on the well 112. These stages/intervals 142 of the well may be isolated from each other via packers 144 set in the well. Well stimulations may be performed on one or more of the stages 142 of the horizontal well 112 to increase the productivity of the well 112. These stimulations may include, for example, injection of various fluids into the different stages 142, delivering proppant sand downhole to form or enhance fractures 144 in the formation adjacent the different stages 142, among others. The relative spacing of stages 142 and the type of stimulation operations to be performed on each stage 142 may be determined by running the 3D reservoir model through a fracture model as shown in the workflow 10 of FIG. 1. As mentioned above, the 3D reservoir model may be constructed using both the log data obtained by sensors 122 in the well logging tools 118 and the 3D seismic data obtained by the receivers 132.

Figure 3:
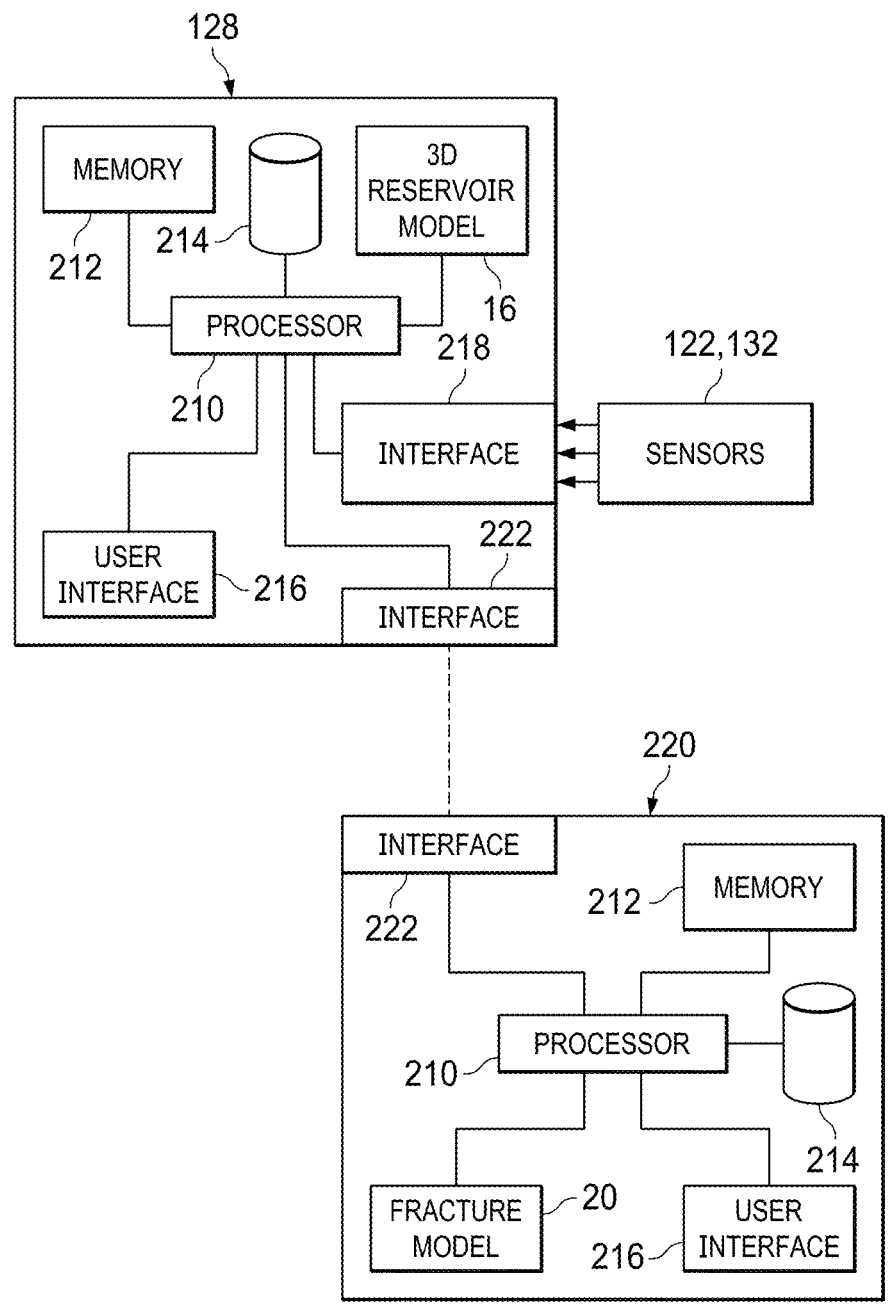
FIG. 3 is a schematic block diagram of information handling systems that may be used to determine engineered completions for an unconventional well, in accordance with an embodiment of the present disclosure.

FIG. 3 is a schematic block diagram illustrating various hardware components that may be utilized in the control system 128 of FIG. 2A to compute the disclosed 3D reservoir model and input the reservoir model into a fracture model to determine optimized completions for a horizontal well. The control system 128 may include, among other things, one or more processing components 210, one or more memory components 212, one or more storage components 214, and a user interface 216. The control system 128 may include one or more communication interfaces 218 that enable the control system 128 to receive data from the various sensing components on location (e.g., log data from sensors 122 and 3D seismic data from geophones 132).

The processing component 210 may be operably coupled to the memory component 212 to execute instructions for carrying out the presently disclosed techniques. These instructions may be encoded in programs that may be executed by the processing component 210 to perform the disclosed workflow of FIG. 1 and generate the 3D reservoir model 16. The codes may be stored in any suitable article of manufacture (such as the memory component 212) that includes at least one tangible non-transitory, computer-readable medium that at least collectively stores these instructions or routines. In this manner, the memory component 212 may contain a set of instructions that, when executed by the processing component 210, performs the disclosed method. The storage component 214 may include any number of databases or similar storage media that can be queried from the processing component 210 as needed to perform the disclosed method. The user interface 216 may include various input/output devices that enable an operator to, for example, input parameters for the modeling process taking place, or visualize an output image of the 3D reservoir model on a digital display. The 3D reservoir model 16 may model the distribution of one or more reservoir properties (e.g., effective porosity, hydrocarbon saturation, Young's modulus, Poisson's ratio, rock type, clay volume, bulk density etc.) throughout a subsurface 3D volume. The control system 128 may generate the 3D reservoir model 16 based on data received from the sensors 122 and geophones 132, in accordance with instructions executed by the processing component 210.

The control system 128 may be communicatively coupled to another control system 220 that includes fracture modeling software (i.e., fracture model 20). The control system 128 may include a communication interface 222 through which the control system 128 sends the 3D reservoir model 16 as an input into the fracture model 20 within the second control system 220. It should be noted that, in other embodiments, the fracture model 20 may be included in the same control system as the 3D reservoir model 16, or the components of the illustrated control systems may be distributed throughout a greater number of control systems. Such distributed control systems may all be located at the well site, or one or more of the control systems may be at a location remote from the well site. In any instance, the 3D reservoir model 16 (or a selection of data therefrom) is provided directly as an input to the 3D fracture model 20.

The second control system 220 may include roughly the same types of components as the control system 128, including but not limited to one or more processing components 210, one or more memory components 212, one or more storage components 214, a user interface 216, and one or more communication interfaces 222.

The fracture model 20 may design optimized multiple fracture treatments to be performed at each of the well stages along a horizontal well or multiple horizontal wells. The fracture model 20 may receive information regarding reservoir characteristics (e.g., as generated in the 3D reservoir model 16) and determine, based on this input, the optimized fracture treatment that will result in the greatest amount of hydrocarbon production. The fracture model 20 may output to an operator a list of fracture treatments to be performed on a horizontal well. These treatments may each include one or more of a fracture geometry, a stimulation fluid type, a proppant type, a proppant size, a stage spacing of specific additives, and/or a location of the fracture along the horizontal well.

Having now described the components that make up the control system(s) 128 and 220 used to generate the 3D reservoir model 16 and provide engineered completions, a detailed method of this process for generating and using the 3D reservoir model 16 will now be described.

Figure 4:
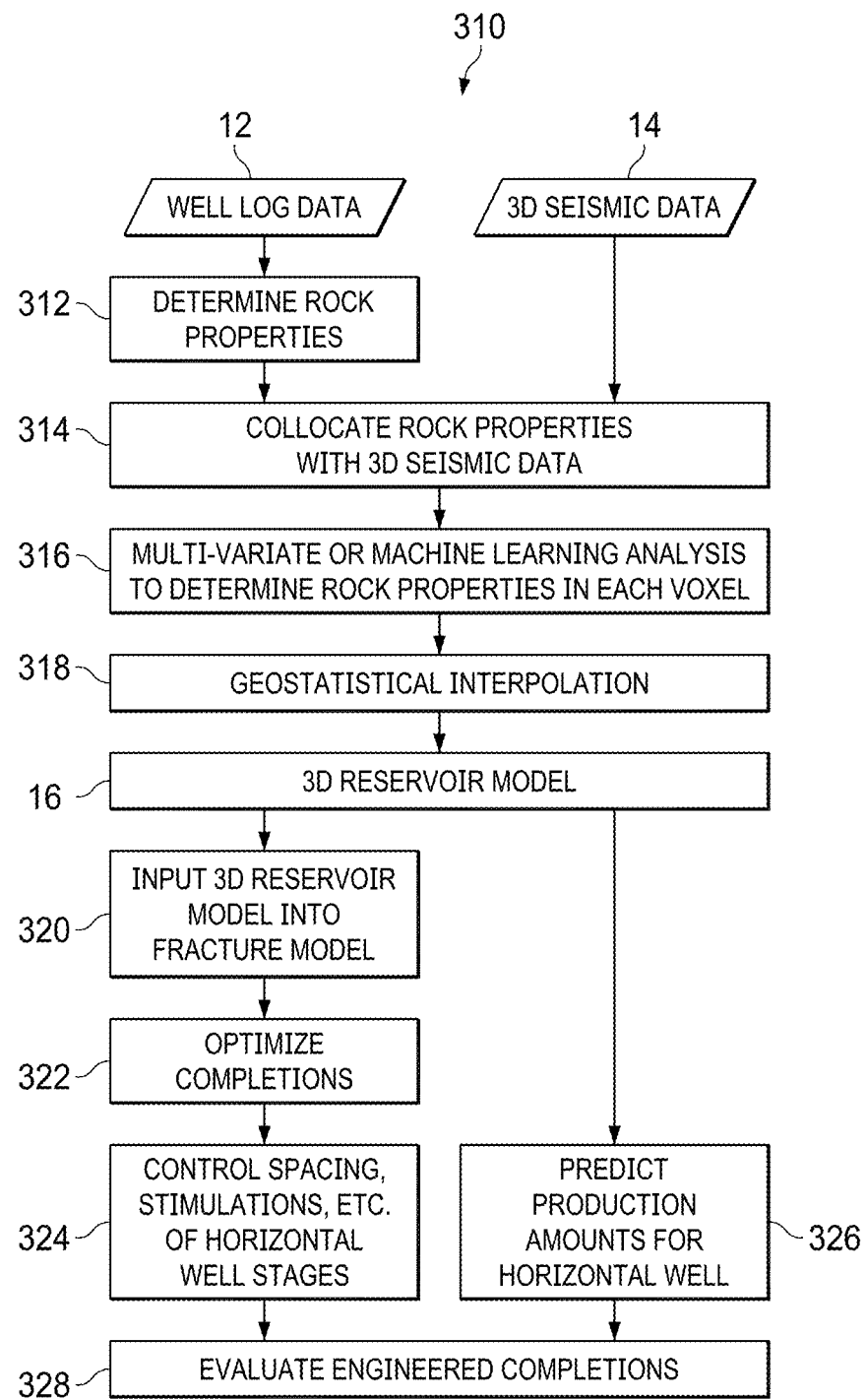
FIG. 4 is a process flow diagram of a method for designing engineered completions based on existing, subsurface well log data and 3D seismic data, in accordance with an embodiment of the present disclosure.

FIG. 4 illustrates a process flow diagram of a method 310 for generating the 3D reservoir model based on sensor readings and providing engineered completions based on the 3D reservoir model. It should be noted that the steps illustrated in various blocks of the method 310 may in some embodiments be performed in different orders than the one illustrated. The steps of some blocks may be combined or eliminated in other embodiments. Additional steps than those illustrated may be performed in some instances as well.

The method 310 may include receiving well log data 12 taken from vertical and horizontal wells formed at a well site. The log data 12 may be received at the control system (128 of FIG. 2A), for example, from the sensors (122 of FIG. 2A) lowered into the wells, as described above. The well log data 12 is subsurface data taken in the form of well logs in the area where horizontal wells are to be drilled, as described above with reference to FIG. 2A.

The method 310 includes determining rock types and rock properties 312 associated with the formations through which the wells are drilled, based on the well log data 12. The well log data 12 is used to generate a rock-type log or facies log that breaks each of the wells into rock types along the length of the well. The resulting sets of rock-type logs provide information regarding how the rock types/geology are arranged in the well pad area. Other rock properties that may be determined include, for example, porosity, clay volume, density, hydrocarbon saturation, Young's modulus, and Poisson's ratio, among others.

To determine these rock properties 310, the well log data 12 may be input into a petrophysical model (18 of FIG. 1) stored in the control system. The petrophysical model may incorporate a rigorous multi-mineral analysis with k-means clustering and other classification techniques on vertical and deviated wells. Multi-mineral analysis (modeling) solves for the volumetric fractions of various mineral components (such as, for example, limestone, dolomite, sandstone, clay, etc.) and defines bulk mineralogy, matrix density, total porosity, effective porosity, and clay using digital well log data. The multi-mineral analysis computes mineralogical components, such as limestone, sandstone, dolomite, and clay from the input wireline log data, and uses these matrix components to determine thickness, hydrocarbon saturations and effective porosity within the geologic layers of the reservoir. The rock types, based on clustering/classification techniques, identify hydrocarbon pay flags and assist in the spatial correlation of these properties in the resulting 3D reservoir model. Given the log databases used in a particular basin, this analysis may be accomplished by using triple and quad combo log data, as well as other types of logging data.

Figure 5A:
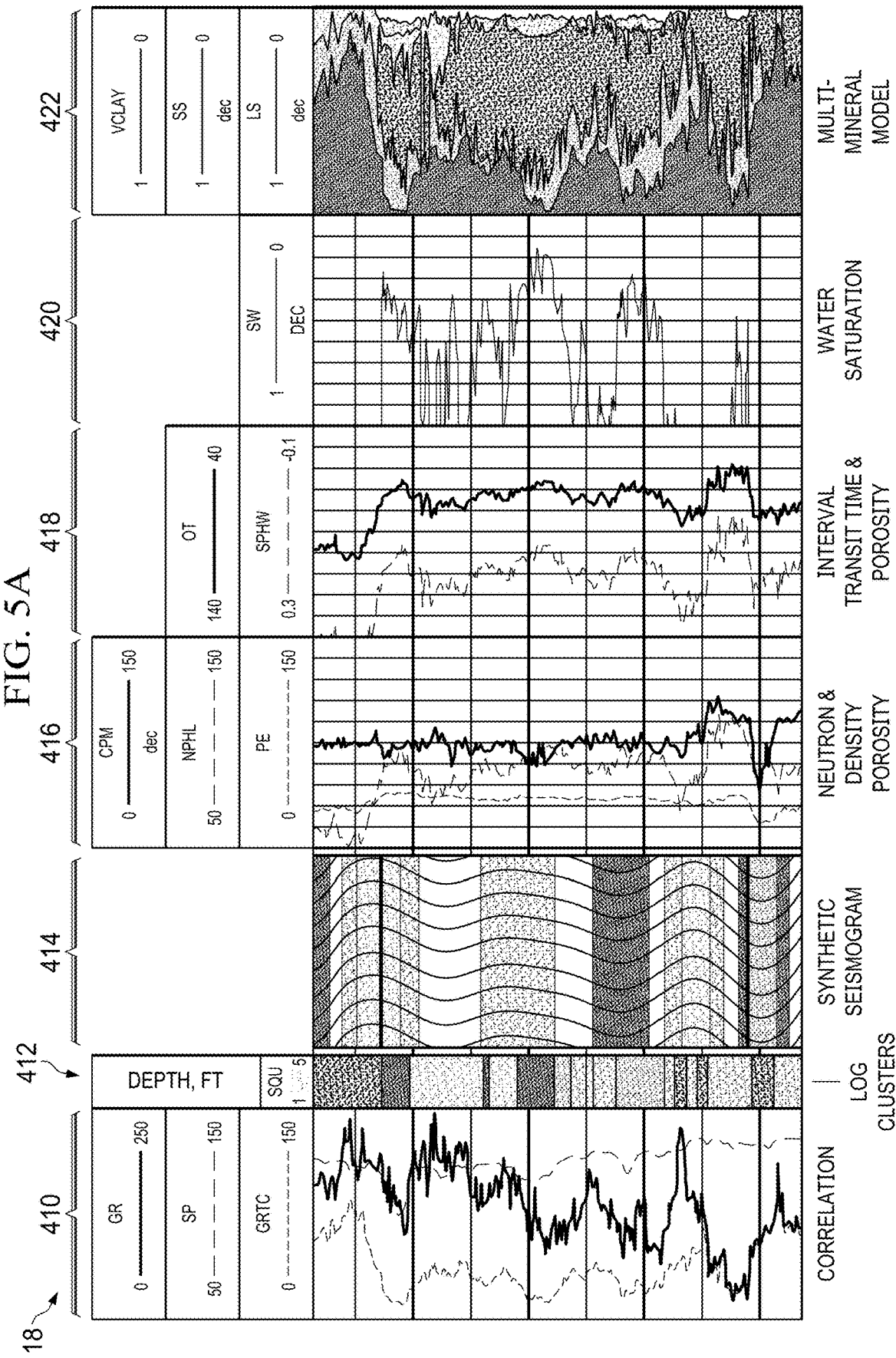
FIGS. 5A and 5B illustrate a series of plots and logs representing a petrophysical model generated from data obtained via a well log within an oil and gas producing region, in accordance with an embodiment of the present disclosure.

FIG. 5A illustrates an example result of the well log data input to the petrophysical model 18 in accordance with the above described multi-mineral analysis. FIG. 5A provides a series of logs that represent different information about rock properties determined based on well logs taken from wells in a study area. From left to right, this information may include correlation 410, log clusters 412, synthetic seismogram 414, neutron and density porosity 416, interval transit time and porosity 418, water saturation 420, and a multi-mineral model 422. Other types and amounts of rock properties than those illustrated may be determined using the petrophysical model 18.

The section entitled "correlation" 410 may illustrate the initial electrical log of vertical well data taken by sensors (e.g., gamma ray) lowered through the vertical well. The log clusters 412 illustrate the rock typing at different vertical locations, as determined based on the correlation data 410. The interval transit time and porosity 418 is based on acoustic measurements taken via the well logging equipment. The multi-mineral model 422 illustrates the relative amounts of different rock types found at different depths along the vertical well. The multi-mineral model 422, for example, may track the relative amounts of limestone, sandstone, dolomite, and clay at different depths along the well.

Figure 5B:
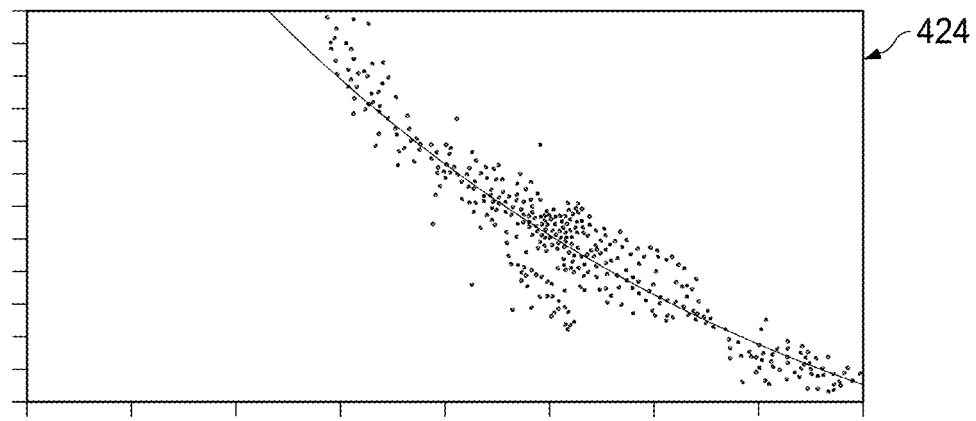
Figure 5B:
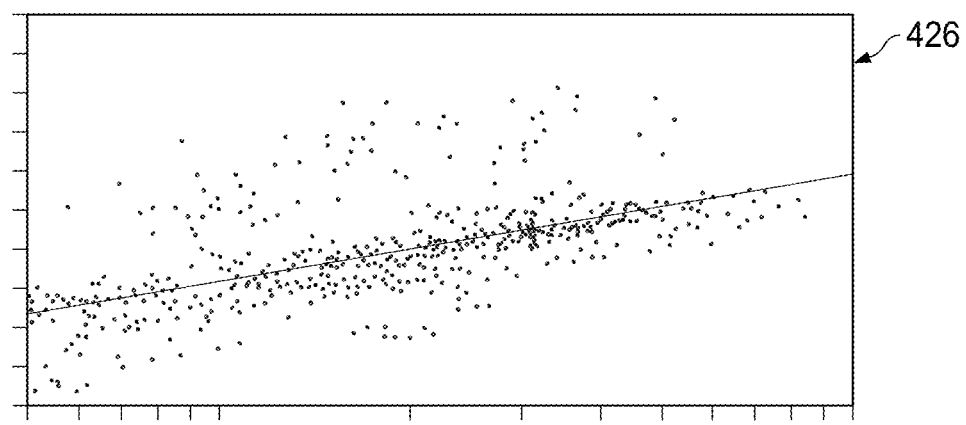
Figure 5B:
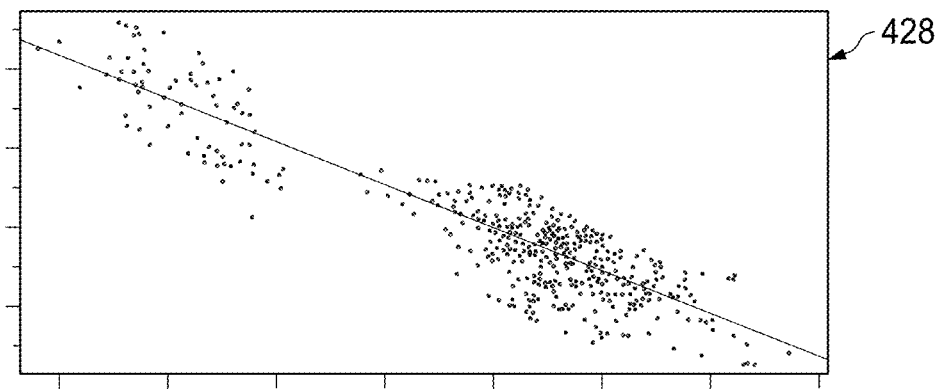

The synthetic seismogram 414 generally illustrates a synthetic seismic signal based on the rock properties determined from the well log data. Such rock properties may include, for example, clay volume, acoustic impedance, and porosity, among others. The relationships between these rock properties and the expected seismic signals at a downhole location are rooted in physics and illustrated in three plots 424, 426, and 428 illustrated in FIG. 5B. The plot 424 illustrates a known relationship between impedance (seismic attribute) and clay volume (rock type). The plot 426 illustrates a known relationship between velocity (seismic attribute) and resistivity (rock property). The plot 428 illustrates a known relationship between impedance (seismic attribute) and porosity (rock property). As such, the control system may determine the synthetic seismogram using the various determined rock properties (e.g., clay volume, resistivity, and porosity) in combination with known relationships between these properties and associated seismic elastic properties that are stored in a database of the control system.

After results are completely processed and analyzed via the petrophysical and classification model, they are correlated to seismic elastic properties and used in a multivariate/machine learning investigation of the 3D seismic data. Turning back to FIG. 4, the method 310 includes receiving the 3D seismic data 14 (e.g., taken via geophones 132 of FIG. 2A) at the control system (128 of FIG. 2A). The control system 128 then collocates 314 the rock properties 312 determined by the petrophysical model with the 3D seismic elastic and attribute data 14.

The 3D seismic data 14 helps to create a structural framework (i.e., faulting and structural dip) for a given well pad, along with deriving multiple seismic attributes and elastic invention property volumes within the region. Classic instantaneous and geometric response attribute analysis of the 3D seismic volume may be performed over the entire seismic volume. Multiple attributes are selected to cover a wide range of seismic frequencies and dimensions to highlight vertical and horizontal variations within the study area. The 3D seismic data 14 and all computed attributes including elastic properties (velocity, acoustic impedance, density) may be converted to depth and precisely collocated 314 with the analyzed vertical and deviated well logs.

The seismic attributes and rock properties 312 may then be used in a multivariate or machine learning analysis 316. The seismic attributes and rock properties 312 may be mapped together using artificial intelligence and other analytic techniques and the relationships described above between seismic attributes and rock properties. The results will produce rock properties, such as effective porosity, hydrocarbon saturation, Young's modulus, and Poisson's ratio, within every voxel or cell of the 3D volume.

This multivariate analysis 316 based on well log data determined rock properties 312 collocated with the 3D seismic elastic and attribute data 14 helps to build a very accurate subsurface reservoir model. This is because the well logs taken from multiple wells distributed at random points throughout the study area provide very good vertical resolution (with limited spatial resolution), and the seismic data taken across the study area provides much greater continuous spatial resolution (with less vertical resolution). Combining these two types of different measurements into an analysis of the subsurface 3D volume provides enhanced resolution of rock property determinations made throughout the volume.

After this initial mapping of rock properties from wireline well log data and 3D seismic information, geostatistical interpolation techniques 318 may be used to distribute final rock properties throughout the 3D seismic volume, thus resulting in the disclosed 3D reservoir model 16. The rock types previously developed on the well logs may be used as soft or guiding data in the geostatistical interpolation 318 of the reservoir properties throughout the 3D volume to capture subsurface reservoir heterogeneity and define small-scale variability during the interpolation process. The rock types may be particularly important around fault planes where the seismic wavelets become uncorrelated to the rock properties.

The geostatistical interpolation 318 ensures spatial continuity and captures the small-scaled variability of the reservoir properties throughout the 3D model, in addition to managing uncertainty through multiple, equiprobable realizations and probability distributions. In this reservoir characterization, understanding the uncertainties associated with the different datasets input into the model 16 enables the proper assignment of values (and the disregard of outliers) to the data as it is being combined. This analysis helps to clarify ambiguities from the combined datasets and to produce a more reliable 3D reservoir model 16 than has previously been developed.

Figure 6:
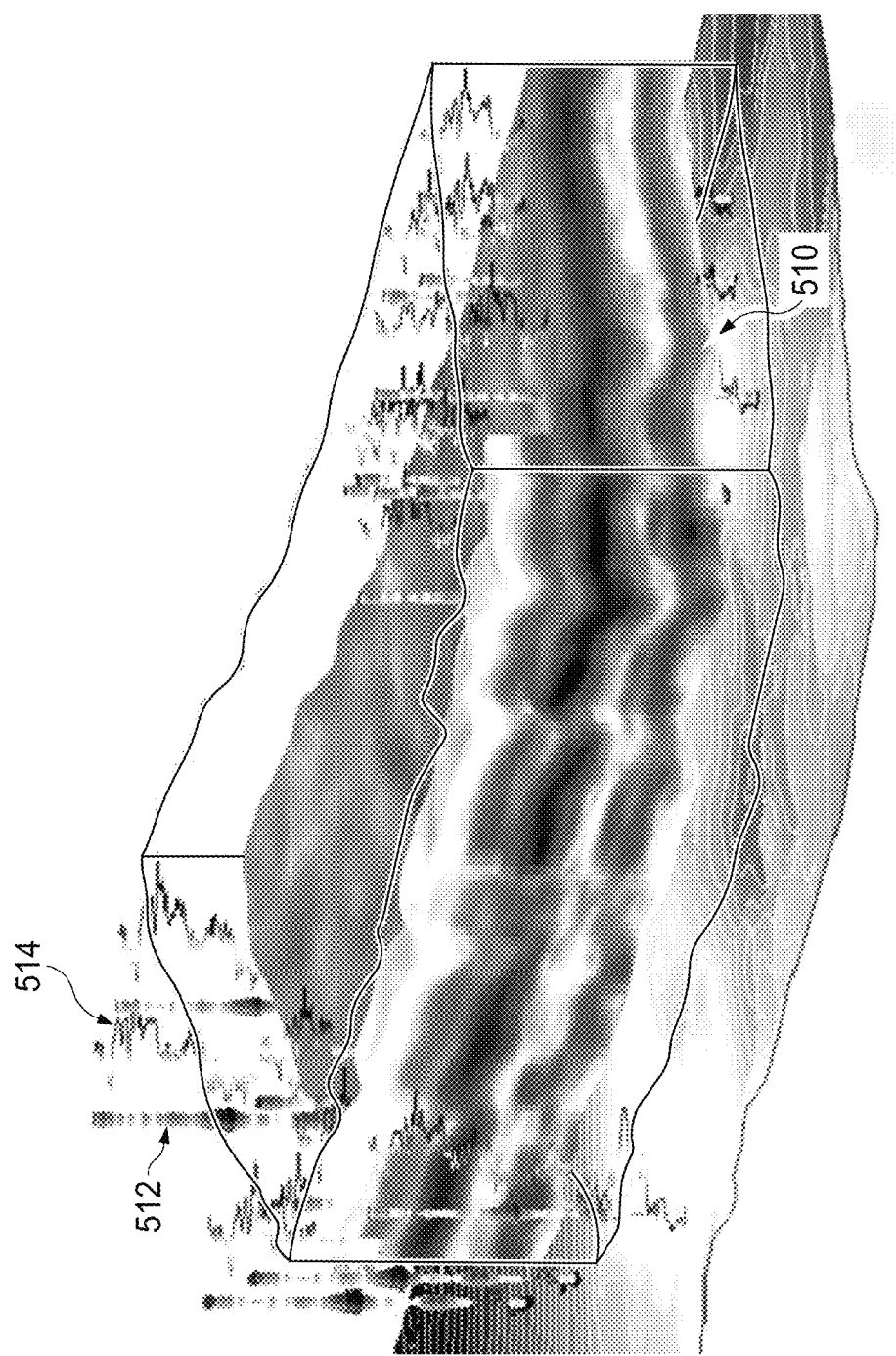
FIG. 6 is a 3D plot representing the geology of an oil and gas producing region based on well log data and 3D seismic data, in accordance with an embodiment of the present disclosure.

FIG. 6 provides an example of a resulting model of hydrocarbon saturation distributed throughout a 3D volume 510 as described above. FIG. 6 shows the locations of various vertical wells 512 (with illustrations of their electrical log data 514) distributed throughout the 3D volume 510. The well log data taken from these vertical wells 512, as described above, may be combined with 3D seismic data to model the hydrocarbon saturation throughout the entire 3D volume 510. The varied shading within the 3D volume 510 represents a predicted hydrocarbon saturation within the 3D reservoir model. The resulting model provides a dense and accurate volume of reservoir geology for use in optimized completion designs.

Turning back to FIG. 4, once the 3D reservoir model 16 has been generated by the control system, the method 310 may involve inputting 320 information from the 3D reservoir model 16 directly into the fracture model (20 of FIG. 1) to provide engineered completions for a particular set of horizontal wells located within the 3D volume. Engineered completions diverge from geometrically generic completion designs, since they involve applying geological science along the wellbore to optimize completions 322 and increase the recovery factor and production of the oil in place. Engineered completions thus account for the horizontal and vertical heterogeneity of the reservoir, allowing for a more accurate design of the fracture stimulation.

Results from the statistical rock physics workflow (i.e., 312, 314, 316, 318, 16) are directly imported 320 into the hydraulic fracture modeling software (20 of FIG. 1). That way, the information provided to the fracture modeling software is not limited to rock properties located just around the borehole, as is the case with current engineered completions based solely on a horizontal well log. The information provided to the fracture modeling software will include rock properties located throughout the 3D volume, providing a more accurate picture of the reservoir compared to existing techniques.

Because current methods for fracture modeling use a single log to propagate properties along the lateral, fracture geometries and resulting production are inherently coupled. This coupling may be indirect, but all properties are tied to a single log. More realistic fracture geometries and production estimates result from uncoupling the distribution of geomechanical properties that govern geometry from the reservoir properties that govern production.

A 2D slice along the length of the lateral is taken from the 3D reservoir model 16, along with the corresponding reservoir and geomechanical properties. Exporting these reservoir properties into the fracture model 320 enables the preservation of the subsurface structure and reservoir characteristics, and ensures that the wellbore is in the correct position within the reservoir. The properties used in the fracture modeling software may include clay volume, effective porosity, water saturation, bulk density, Poisson's ratio, and Young's modulus. These properties may then be used to develop other inputs (such as stress, process zone stress, and permeability) used to develop the fracture geometries and their subsequent production.

The fracture model is used to determine optimized engineered completions 322 to be performed on the horizontal well to result in maximum production and recovery of hydrocarbons from the well. Multiple fracture treatment schedules have been developed for each basin and formation, and are designed based on economics, effectiveness, and success rates. These various fracture treatments may be tested using the reservoir model and will change depending on the borehole placement in the subsurface targets and the fracture objective. Fracture simulations may be performed on all or representative stages using these multiple treatment schedules. These simulations will vary fluid types, proppant types, stage spacing, additives, and other treatment options. For example, certain parts of the reservoir might require slickwater treatments while others might require hybrid treatments based on reservoir characteristics. A hybrid treatment consists of a low viscosity portion of fluid in which lower sand concentrations are first pumped. The low viscosity portion is usually water but can also be linear gel.

From these simulations, production prediction curves are created for each fracture stage. Along with costs, net present value (NPV) for each stage is examined, and the process is iterative, changing the fracture treatment and NPV until the goal of the modeling is met. Unique fracture treatments may then be chosen for each individual stage along the borehole to maximize the production and recovery factor, and ultimately the NPV for each well on a pad, resulting in the optimum treatment at the best cost.

Figure 7:
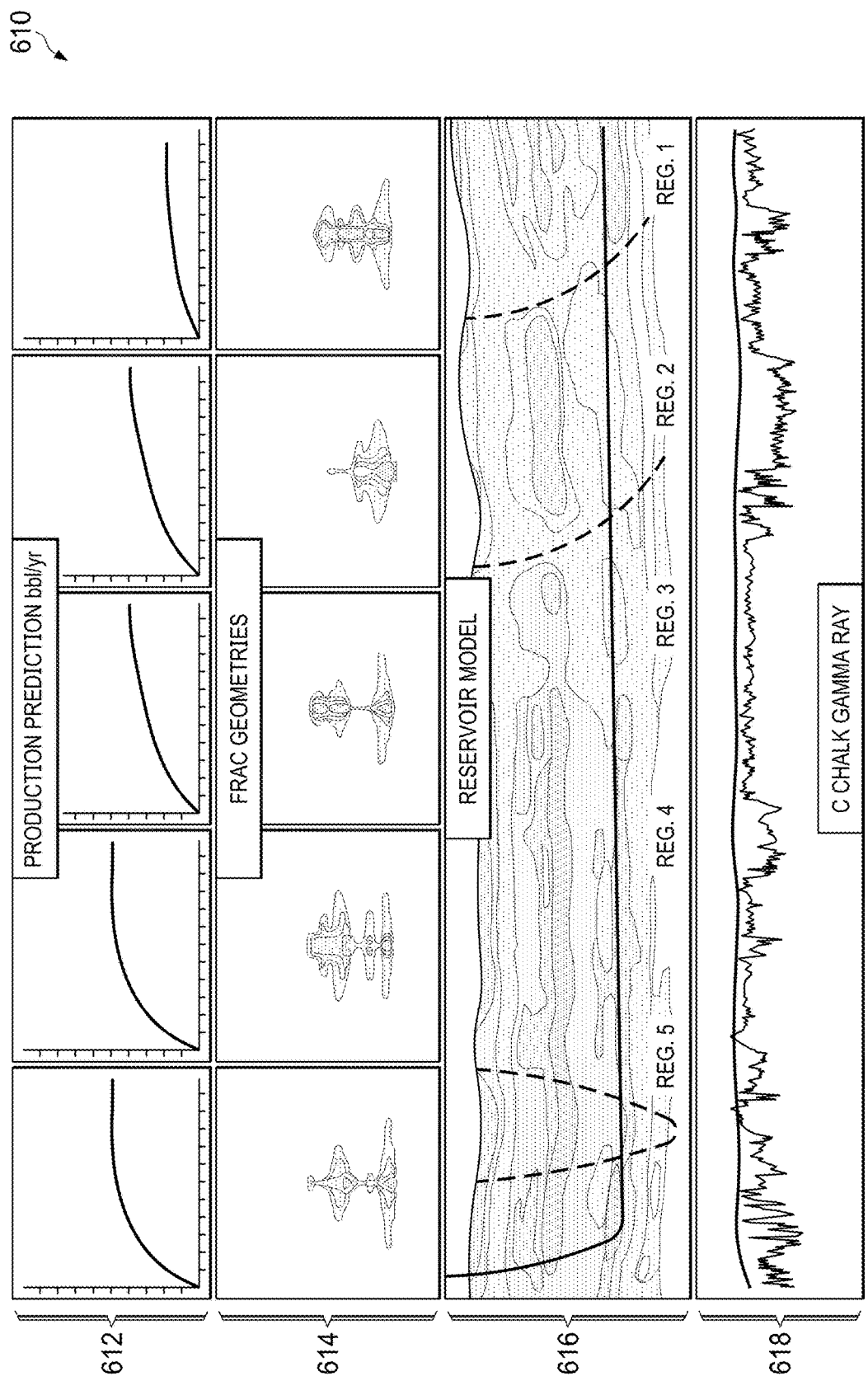
FIG. 7 is a series of plots illustrating engineered completions as determined by a fracture model, in accordance with an embodiment of the present disclosure.

FIG. 7 is an example of the result of using information from the 3D reservoir model 16 directly in the fracture model 20 to determine the optimized completions for a well. The results are shown in a series of plots 610, including production prediction curves 612, fracture geometries 614, a 2D slice of the reservoir model 616 showing the location of various stages, and well log data 618 (e.g., gamma ray) taken along the horizontal well. As described above, with the information input directly from the 3D reservoir model, the fracture model cycles through the various available fracture simulations to determine which fracture geometry 614 will yield the greatest NPV (as shown in production prediction curves 612) for each stage in the horizontal well. The fracture simulations may cycle through different frac heights, job sizes, fracture fluids, types of proppant, stage spacing/iterate, etc. In this way, the fracture model is able to provide optimized engineered completions that rely on data taken from the disclosed 3D reservoir model. The fracture model is able to take advantage of known geology not just close to the borehole, but at further distances (above, below, and away) from the borehole as well, not to miss valuable hydrocarbon stores that are not directly detectable from the immediate well log.

Turning back to FIG. 4, once the optimized completions 322 are determined, well operators may use the results of this optimization to control 324 the spacing and stimulations that are performed at well stages along the horizontal well. The operators may perform the engineered completions on the well as specified by the fracture modeling software, and production of the well may begin. The method 310 may further include predicting production results 326 for the horizontal well based on the 3D reservoir model, and evaluating 328 the effectiveness of the engineered completions performed on the well based on the reservoir model prediction.

Figure 8:
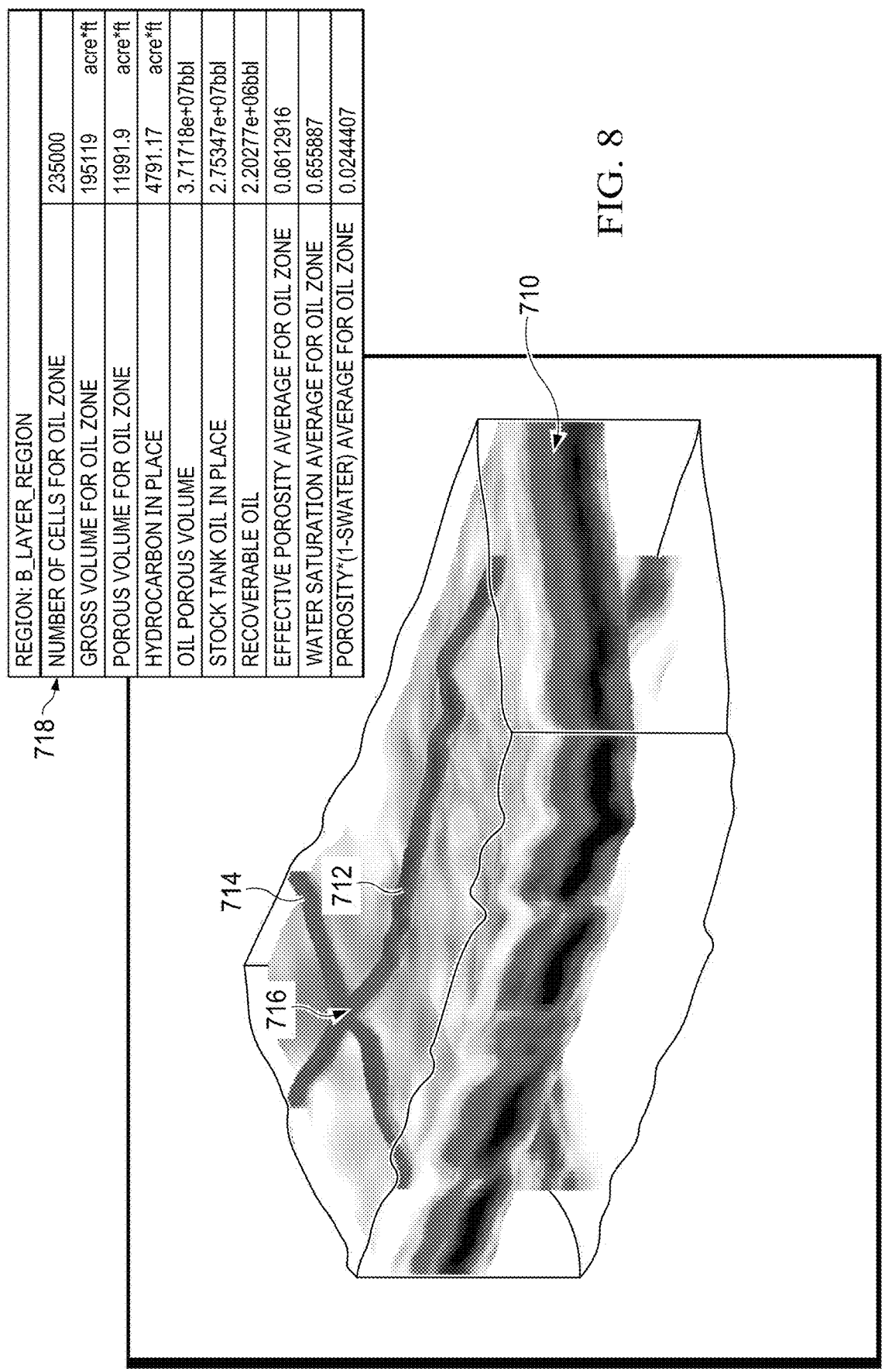
FIG. 8 is a 3D plot representing the geology of an oil and gas producing region along locations corresponding to a horizontal wellbore and production predictions, in accordance with an embodiment of the present disclosure.

The 3D reservoir model 16 may be utilized to predict the amount of hydrocarbons that will be produced from the horizontal well. FIG. 8 shows an example of a 3D reservoir model generated in accordance with the method above. The figure shows a 3D volume 710 of rock that will be stimulated in a completed horizontal well. The volume 610 may be subdivided into sub-regions around the borehole, e.g., bound by two 2D slices 712 and 714 as shown. The 2D slice 712 may be oriented vertically and correspond to a length of the well lateral, while the 2D slice 714 may be oriented vertically and perpendicular to the lateral direction of the 2D slice 712. The 2D slices 712 and 714 may generally intersect at a location 716 corresponding to the vertical portion of the well. The illustrated 3D volume 710 may be just a piece of the overall volume for which the reservoir characteristics are provided in the 3D reservoir model. The reservoir properties within this smaller 3D volume 710 centered around the horizontal well, however, may be used to model or predict the production results for the completed well. The reservoir characteristics in this 3D volume 710, for example, may be used to compute stock-tank original oil in place (STOOIP), which is the amount of oil in the 3D volume 710, and other reservoir characteristics of the volume as listed in chart 718. Knowing the estimated STOOIP allows for a prediction of the amount of oil recoverable from the well give a specific recovery factor. For example, the expected typical recovery for a horizontal well may be 7% or 8% of the STOOIP calculation. This calculation gives operators a baseline for calibrating the effectiveness of the engineered completions using the 3D reservoir information, allowing the operators to make more effective business decisions.

Directly importing the rock physics based 3D reservoir model into the 3D fracture model enables laterally and vertically varying reservoir properties across the length of the horizontal, which was not possible previously. It also enables more accurate calculations of permeability, stress, and fracture geometries, because of the 3D nature of the reservoir and fracture model. In addition, the production predictions obtained from the integrated fracture model are in much closer agreement with the actual production in the area, lending confidence to the quality of the reservoir-driven fracture designs. In some cases, both the 3D reservoir model and the developed fracture model might be used to populate a dynamic reservoir model for drainage, well spacing determinations, and history matching, and the production optimization can be performed inside a dynamic model.

EXAMPLE

The disclosed workflow of FIG. 4 was applied to data from a horizontal well in a particular unconventional reservoir. The reservoir is a highly faulted and stratigraphically variable unconventional oil play consisting of multiple chalk benches that are the reservoir target for horizontal drilling. Faults are contained within the formation, and the fault throws tend to decrease, or sole, with depth. On average, the fault throws can cause discontinuities within the chalk benches, making horizontal drilling a challenging process.

More importantly, the reservoir quality along the length of the horizontal is also laterally variable, such that STOOIP numbers can dramatically change from pad-to-pad, bench-to-bench, and well-to-well on the same drilling pad. Portions of the chalks can have better effective porosity, hydrocarbon saturations, and pressure than other areas due to the compartmentalization caused by faulting. This reservoir variability occurs across short distances, causing significant differences between wells on a pad, and even within a single horizontal well. Previously, detailed 3D structural framework modeling using 3D seismic and offset well control aided drilling engineers to accurately land the horizontal, remain in the chalk benches, and mitigate drilling hazards; consequently, it dramatically reduces tortuosity of the wellbore, allows the lateral to stay in zone, enables drilling in fewer days, and reduces overall costs. The disclosed approach now addresses the reservoir component of the equation in terms of STOOIP calculation at the DSU level, chalk bench layers, and the individual well levels by applying the reservoir characterization workflow, subdividing these different levels into regions, and computing oil-in-place and estimating recovery factors for each region. This approach enables a more thorough evaluation of horizontal well recovery factors and provides a clear benchmark to compare the integrated fracture modeling results with actual fractured well results.

The horizontal well selected for this example is a two mile long lateral that targets a particular chalk bench within the reservoir. The available vertical digital well control in the area was petrophysically analyzed (312 of FIG. 4) and clustered using the workflows for mineral composition, effective porosity, hydrocarbon saturations, clay volumes, and rock types, as shown in FIG. 5A. Formational and intraformational tops of the chalks and marls in the reservoir were hand-picked on the vertical control well for building the structural framework and integrated with the depth-converted seismic time picks from the 3D seismic volume. Seismic elastic inversions and attribute analysis were computed from the 3D seismic volume and were chosen to highlight changes in lithology, structure, effective porosity, hydrocarbon saturations, thickness, and geologic interfaces. Digital well control was exactly collocated (314 of FIG. 4) with the seismic data and seismic attributes at this point. The rock properties from the wells and elastic properties from the seismic data were analyzed with multivariate techniques, analysis, and machine learnings, so that the rock properties (effective porosity, hydrocarbon saturation, clay volume, bulk density, and geomechanical properties) from the sparsely distributed well data are trained and computed for each voxel inside the 3D seismic volume (316 of FIG. 4). Multiple equi-probable stochastic simulations of the multivariate and machine learning results and the corresponding probability distributions (P10, P50, and P90) propagate the computed rock properties from the multivariate analysis through the volume study area to enable the STOOIP numbers to be calculated in all regions at all levels in the study area (318 of FIG. 4).

The 3D subsurface reservoir model (16 of FIG. 4) for the study area is reviewed and finalized and directly loaded into the 3D hydraulic fracture model (320 of FIG. 4). Consequently, the two-mile horizontal well survey (618 of FIG. 7) and the corresponding model cross section (616 of FIG. 7, displayed in 2D although the data is in 3D) from the 3D reservoir model is used for 3D fracture stimulation modeling. For this example, five regions are identified along each of the laterals, and representative stages from those regions are chosen for fracture modeling purposes. Multiple fracture designs (614 of FIG. 7), including slickwater and hybrid fluid designs with varying proppant size, mass, rates, and stage spacings were modeled using the properties from the reservoir model. Production predictions (612 of FIG. 7) for each iteration were compared; in this case, the results that indicate the highest recovery and highest NPV were ultimately chosen for the final fracture schedule, shown in FIG. 7.

RESULTS

The resulting rock property volumes generated for the reservoir, using the disclosed statistical workflow, have made up a comprehensive baseline model for direct use by drilling engineers, reservoir engineers, reserve engineers, and completion engineers (see FIG. 8). The STOOIP calculations for the entire DSU, as well as for each individual well, show that there are approximately 47 MMBO in place for the 1280 DSU and 7.3 MMBO for the two-mile study well using the region developed for this well. Using a 7% recovery factor, this well should produce approximately 500 K bbl oil. However, factors such as pad well spacing density, frac bashing, vertical production interference, pressure depletion, and orientation of the horizontal with respect to the local stress field can alter this calculation. From other studies conducted throughout the basin, these reserve calculations vary because of stratigraphic variability within the chalk benches, faulting, and structural orientation, but these baseline models provide very realistic reserve estimates for the individual wells and individual pads at different locations within the basin.

One result from the hydraulic fracture modeling process is that like stress environments did not necessarily correlate to like reservoir environments. In older, outdated fracture modeling procedures, if a part of the wellbore was landed exactly midway in the target, any other time the wellbore crossed this target line, hydraulic fracture geometries and production would be identical. This was because of how properties were uniformly propagated across the entire length of a 2 mile horizontal well. Decoupling the distribution of the geomechanical properties and reservoir properties, according to the presently disclosed workflow, emphasizes the heterogeneity of both types of properties. This provides a more laterally varying and realistic model than existing models that use simple geometric propagation of generically defined stages to stimulate a well.

The statistical rock physics workflow provides the ability to perform true engineered completion modeling from these baseline models. Hydraulic fracture designs may now be optimized based on the percentage of well in zone, stress, reservoir properties above, below, and away from the well, and interference effects from adjacent wells. All aspects of the engineered hydraulic fracture treatment may be individualized on the variable rock properties, including variable stage spacing, fluid volume and type, additives, and proppant concentrations. Based on the optimized designs, a more accurate production prediction at the stage level may be determined and validated with large proprietary completions databases.

The statistical rock physics approach for reservoir characterization coupled with the engineered completion techniques may provide numerous benefits to the development of oil and gas assets in unconventional oil and gas formation reservoirs. Reservoir characterization brings real value by better discerning the resource-in-place, reservoir properties, and the hydrocarbon distribution within each reservoir layer. From this, wells can be more accurately placed in the most productive zones within the target formations. STOOIP calculations from the 3D model provides a better understanding of the production potential on a per well basis, and ultimately manage production expectations for a drilling unit. Additionally, this enables operators to high grade their acreage in terms of drilling hazards, target definition, well orientation, and reserves in place for full field development and asset management. The disclosed statistical rock physics approach, which integrates well logs, rock typing, 3D seismic data, and geostatistics, provides a very accurate method for characterizing geologic formation reservoirs.

Tightly integrating the statistical rock physics reservoir analysis with engineered completions results in more realistic completion designs and accurate production forecasting. The heterogeneous rock property volumes create unique fracture models for each stage along the length of a lateral.

This enables each fracture design to be optimized, maximizing the productive reservoir contact in each region. The 3D reservoir model along with the 3D fracture modeling provides an understanding of well production interference, which aids in the determination of optimal well spacing in a DSU in order to maximize NPV in the DSU. Another result of the statistical rock physics and 3D reservoir model and fracture stimulation modeling workflow is a benchmark resource volume, which allows production results to be directly compared to a realistic and accurate reservoir model.

The disclosed approach ties a static 3D reservoir model to a 3D fracture stimulation model to a 3D dynamic reservoir model in order to optimize completion designs, determine drainage areas, define well spacings, and history match production. The static model may be efficiently developed as described above. The static reservoir model and fracture stimulation model may be integrated into the dynamic model.

The disclosed approach enables optimization of induced fractures along the lateral of a horizontal well. For example, the optimized fracture completion design type may be slickwater in certain parts of the lateral and hybrid in other parts of the lateral depending upon how good the reservoir is, how far the fracture will grow, and how much of the fracture has contacted the reservoir. Each stage optimization may be tied to the NPV and finally well spacing optimization due to the amount of the STOOIP in the reservoir block that can be recovered by each well. For these reasons, and others, the disclosed workflow enables effective, optimized stimulation (e.g., fracturing) of horizontal wellbores in unconventional resource oil and gas plays to maximize production and economic profitability from these horizontal wells.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A system, comprising:
   at least one well logging tool comprising a sensor for collecting downhole measurements in one or more wells formed within a 3D subsurface volume;
   a plurality of transmitters and geophones configured to collect 3D seismic data corresponding to the 3D subsurface volume;
   a processing component, wherein the processing component is configured to be selectively coupled to the at least one well logging tool and the plurality of geophones via an interface; and
   a memory component containing a set of instructions that, when executed by the processing component, cause the processing component to:
      analyze one or more sets of well log data collected by the at least one well logging tool to generate a petrophysical and geomechanical model of rock properties, wherein each set of well log data is associated with one of a plurality of wells located within the 3D subsurface volume, and wherein the rock properties correspond to locations along each of the plurality of wells;
      generate a 3D reservoir model of a reservoir characteristic distributed throughout the 3D subsurface volume based on the rock properties and 3D seismic data for the 3D subsurface volume, the reservoir characteristic being at least one of formation resistivity, effective porosity, water saturation, clay volumes, bulk density, hydrocarbon saturation, or rock type;
      input at least a portion of the 3D reservoir model into a 3D fracture stimulation model associated with one or more horizontal wells located within the 3D subsurface volume; and
      determine an optimized fracture operation to be performed on the well via the 3D fracture stimulation model and based on a net present value analysis of production expected for a particular stage of the well based on the 3D reservoir model.

2. The system of claim 1, wherein the memory component contains a set of instructions that, when executed by the processing component, cause the processing component to:
   collocate the 3D seismic data with the rock properties of the petrophysical and geomechanical model;
   perform multi-variate analysis and machine learnings on the 3D seismic data and rock properties using statistical methods and artificial intelligence modeling to determine an estimated reservoir characteristic in each 3D voxel within a 3D model volume; and
   generate the 3D reservoir model via geostatistical interpolation of the estimated reservoir characteristic to distribute the estimated reservoir characteristic throughout the 3D model volume.

3. The system of claim 1, wherein the memory component contains a set of instructions that, when executed by the processing component, cause the processing component to:
   directly import at least a portion of the 3D reservoir model into fracture modeling software; and
   run the fracture modeling software on the portion of the 3D reservoir model to determine engineered completions for a horizontal well in the 3D subsurface volume.

4. The system of claim 1, wherein the reservoir characteristic comprises hydrocarbon saturation.

5. A tangible, non-transitory, computer-readable medium comprising machine-readable instructions to:
   receive sets of well log data from one or more well logging tools, wherein the sets of well log data were previously collected via the one or more well logging tools;
   receive 3D seismic data for a 3D subsurface volume, wherein the 3D seismic data was previously collected via a plurality of geophones;
   analyze the sets of well log data to generate a petrophysical and geomechanical model of rock properties, wherein each set of well log data is associated with one of a plurality of wells located within the 3D subsurface volume, and wherein the rock properties correspond to locations along each of the plurality of wells;
   generate a 3D reservoir model of a reservoir characteristic distributed throughout the 3D subsurface volume based on the rock properties and the 3D seismic data for the 3D subsurface volume, the reservoir characteristic being at least one of formation resistivity, effective porosity, water saturation, clay volumes, bulk density, hydrocarbon saturation, or rock type;
input at least a portion of the 3D reservoir model into fracture modeling software associated with one or more horizontal wells located within the 3D subsurface volume; and
run the fracture modeling software on the portion of the 3D reservoir model to determine an optimized fracture operation to be performed on the well based on a net present value analysis of production expected for a particular stage of the well based on the 3D reservoir model.

6. The tangible, non-transitory, computer-readable medium of claim 5, further comprising machine-readable instructions to:
collocate the 3D seismic data with the rock properties of the petrophysical and geomechanical model;
perform multi-variate analysis and machine learnings on the 3D seismic data and rock properties using statistical methods and artificial intelligence modeling to determine an estimated reservoir characteristic in each 3D voxel within a 3D model volume; and
generate the 3D reservoir model via geostatistical interpolation of the estimated reservoir characteristic to distribute the estimated reservoir characteristic throughout the 3D model volume.

7. The tangible, non-transitory, computer-readable medium of claim 5, wherein the fracture modeling software comprises machine-readable instructions to:
perform iterative simulations of a fracture operation, each simulation having a different fracture geometry, fracture height, fracture fluid, proppant type, or proppant size;
evaluate a predicted net present value (NPV) for each fracture operation; and
select the fracture operation with the greatest predicted NPV for the optimized fracture operation.

8. The tangible, non-transitory, computer-readable medium of claim 5, further comprising machine-readable instructions to predict production results for a horizontal well in the 3D subsurface volume based on the 3D reservoir model.

9. The tangible, non-transitory, computer-readable medium of claim 5, wherein the reservoir characteristic comprises hydrocarbon saturation.

10. A method, comprising:
receiving digital well log data at a control system;
receiving 3D seismic data corresponding to a 3D subsurface volume at the control system;
analyzing the well log data to generate a petrophysical and geomechanical model of rock properties corresponding to locations along a plurality of wells within the 3D subsurface volume;
generating a 3D reservoir model of a reservoir characteristic distributed throughout the 3D subsurface volume based on the rock properties and the 3D seismic data, wherein the reservoir characteristic comprises at least one of formation resistivity, effective porosity, water saturation, clay volume, bulk density, hydrocarbon saturation, or rock type;
inputting data from the 3D reservoir model into a 3D fracture stimulation model associated with one or more horizontal wells located within the 3D subsurface volume; and
determining an optimized fracture operation to be performed on the well via the 3D fracture stimulation model and based on a net present value analysis of production expected for a particular stage of the well based on the input data from the 3D reservoir model.

11. The method of claim 10, wherein the reservoir characteristic comprises hydrocarbon saturation.

12. The method of claim 10, wherein the well log data is collected via one or more well logging tools, wherein each set of well log data is associated with one of a plurality of wells located within the 3D subsurface volume.

13. The method of claim 10, wherein the 3D seismic data is collected via a plurality of transmitters and geophones.

14. The method of claim 10, wherein generating the 3D reservoir model comprises:
collocating the 3D seismic data with the rock properties of the well log data and the petrophysical and geomechanical model;
performing multi-variate analysis and machine learnings on the 3D seismic data and rock properties using statistical methods and artificial intelligence modeling to determine an estimated reservoir characteristic in each 3D voxel within a 3D model volume; and
performing geostatistical interpolation of the estimated reservoir characteristic to distribute the estimated reservoir characteristic throughout the 3D model volume.

15. The method of claim 10, wherein determining the optimized fracture operation for the stage of the well comprises determining a fracture geometry, a stimulation fluid type, a proppant type, a proppant size, pumping rate, or a combination thereof for the stage of the well.

16. The method of claim 10, wherein determining the optimized fracture operation comprises determining a stage spacing for the well.

17. The method of claim 10, further comprising performing the determined optimized fracture operations at the well.

18. The method of claim 10, further comprising predicting production results for a horizontal well in the 3D subsurface volume based on the 3D reservoir model and completion design.

19. The method of claim 18, further comprising:
performing engineered completions on the horizontal well based on the 3D reservoir model; and
evaluating an effectiveness of the engineered completions by comparing a resulting amount of production to the predicted production results.

20. The method of claim 10, wherein the rock properties comprise at least one of clay volume, porosity, and rock type.

* * * * *